Figure 1:
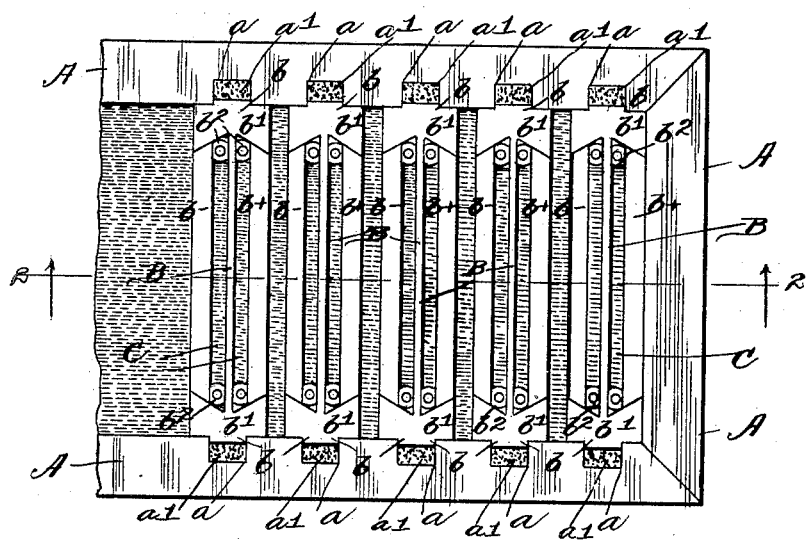

No. 675,586. Patented June 4, 1901.
W. J. BUCKLEY.
ELECTRICAL STORAGE BATTERY.
(Application filed July 5, 1900.)
(No Model.)

Witnesses:
Harry R. White
Roy White

Inventor:
William J. Buckley
By Ford Bain Attorney

UNITED STATES PATENT OFFICE.

WILLIAM J. BUCKLEY, OF CHICAGO, ILLINOIS.

ELECTRICAL STORAGE BATTERY.

SPECIFICATION forming part of Letters Patent No. 675,586, dated June 4, 1901.

Application filed July 5, 1900. Serial No. 22,499. (No model.)

*To all whom it may concern:*

Be it known that I, WILLIAM J. BUCKLEY, a citizen of the United States, residing at Chicago, county of Cook, and State of Illinois, have invented certain new and useful Improvements in Electric Storage Batteries; and I do hereby declare the following to be a full, clear, and exact description, such as will enable persons skilled in the art to which it appertains to make and use the same.

My invention relates to improvements in electric storage batteries, more particularly to that class of batteries wherein the active plates or elements are placed in the excitant or electrolyte in such a way that the electromotive force of each pair or couple of plates will be added to that of its neighbor and in which the electromotive forces of the associated couples will be cumulative, such a type of battery being known in the art as "high-tension" batteries.

The leading object of my invention is to provide a single liquid-containing receptacle for all of the couples or plates, the said receptacle being divided by metallic partitions, providing cells in said receptacle between the said partitions for an electrolyte which is to be contained therein for each couple that is to be placed within the cell thus provided.

A further object of my invention is to provide such a partition of metal, preferably of such a character as to remain unaffected by the action of the electrolyte in which it is immersed, the said partition forming part of the electrical continuity of the circuit which includes the plate.

A still further object of my invention is to provide a means whereby the surface of the plate or element farthest removed from its opposing element when used with an auxiliary partition may be subject to the action of the electrolyte which is common to both elements.

With these and other objects in view, which may hereinafter appear, my invention consists, broadly, in providing a single liquid-receptacle common to all of the elements or couples contained within a battery or series of cells of a given size, dividing the said receptacle into compartments or cells by liquid-tight partitions, and providing an active element or plate having metallic continuity, a portion of said element being on one side of a given partition and being subjected to the electrolytic influence of the liquid in one cell and another portion of the same plate being subjected to the electrolytic influence of the liquid in the neighboring cell forming the opposing element of another cell, and whereby the electrical continuity from one cell to another is completed through the plate itself.

Figure 2:
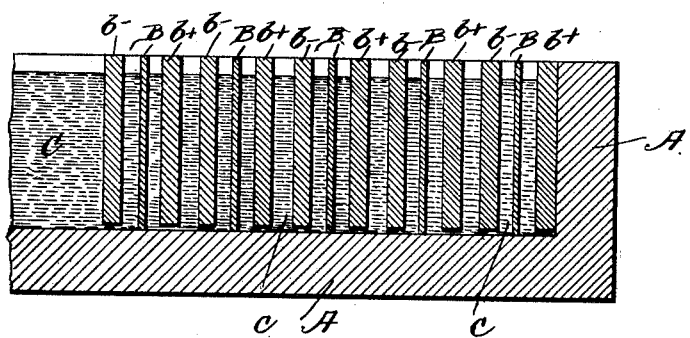

In the drawings, Figure 1 represents a plan view of a portion of a receptacle, showing a series of my compound plates and conducting-partitions regularly arranged therein. Fig. 2 is a section through line 2 2 of Fig. 1.

In the figures the same letters of reference are used to indicate similar parts.

A represents a box or receptacle that may be of wood properly treated or any other non-conductor of electricity provided with vertical grooves $a$, extending from top to bottom, placed at regular intervals and cut in the side of the said box, as shown. A similar series of grooves are cut on the opposite side of the said box. A partition made, preferably, of an alloy composed of antimony and lead, which remains unaffected by the electrolytic action of the electrolyte, is provided at its end with dovetailed extremities $b'$ and a short extending tenon, which is as wide as and is adapted to enter the slot $a$ of the box A. This slot $a$ extends from the top to the bottom of the receptacle or box A. When the metallic partition B is inserted in the groove $a$, a material $a'$, similar in its nature to pitch, is poured into the groove $a$ for the purpose of providing a water-tight joint between said partition and side of said box. By this means a separate compartment or cell is provided between the neighboring partitions, the said compartment being water-tight. The active plates or grid $b^+$ and $b^-$ are then made, their sides tapering, as shown, and slipped into the place provided between the dovetailed extension $b'$ of the partition B. These plates are designated $b^+$ and $b^-$. For the purpose of forcing the active plates $b^+$ and $b^-$ into actual contact with the conducting-partition B, I use an elastic separator $b^2$, which is inserted between the plate and the metallic partition and which constantly exerts a pressure for the purpose of pressing the said plates outwardly and in contact with the metal partition, as shown. This separator may be of metal made resilient, or it may be of soft rubber, or any other means than that shown may be employed for preserving the electrical connection between the active plate and the conducting-partition. In this construction a seemingly anomalous condition exists, which is that a conductor immersed in an electrolyte joins the positive plate on the one side with the negative plate on the other, and, further, that a receptacle containing an electrolyte for a number of different couples that are placed in series therein is divided into cells by metallic partitions, whereby the electrolyte contained within the several cells composing the said receptacle is not electrically insulated one from the other.

I have found that the conducting-frame B, which is adapted to hold the active plate or element, is well adapted to mechanically separate the electrolyte of the neighboring cells. I therefore have constructed my conducting-frame in the manner described and have used it in an effort to economize space and weight and for the further purpose of conducting the current from the active element attached thereto and also for providing a partition, as described. The plates or elements when made of proper material, such as specified for the partitions, may be used in lieu of the partitions provided they are liquid-tight and will effectually prevent the mechanical circulation of the electrolyte.

I believe that I am the first to employ a common receptacle for a number of elements, the electromotive force of which are cumulative, the said elements being connected in series and located in cells in the said receptacle, said cells being formed by means of metallic partitions inserted in said receptacle.

I do not care to be limited to the exact construction shown, as great variation may be made from that without departing from the spirit of my invention.

I claim—

1. A high-tension battery comprising a receptacle, a positive and a negative active plate, a metallic partition dividing said receptacle into cells, projections from said partitions for retaining said plates, spaces between said partitions and the inside surfaces of said plates, and separators within the said spaces adapted to exert an outward pressure upon said plates for maintaining said plates in electric contact with said partitions, substantially as set forth.

2. A high-tension battery comprising a receptacle for an electrolyte, partitions unaffected by the electrochemical action of the battery, dividing said receptacle into cells, projections on the vertical ends of said partitions extending laterally in both directions, forming one element of a fastening for the active plates, and active plates adapted to engage with said fastenings, one plate on each side of each of said partitions, substantially as set forth.

In testimony whereof I have signed this specification, in the presence of two subscribing witnesses, this 30th day of June, A. D. 1900.

WILLIAM J. BUCKLEY.

Witnesses:
JAMES K. PUMPELLY,
M. F. ALLEN.